US006725365B1

(12) United States Patent
Cofler et al.

(10) Patent No.: US 6,725,365 B1
(45) Date of Patent: Apr. 20, 2004

(54) BRANCHING IN A COMPUTER SYSTEM

(75) Inventors: Andrew Cofler, Voreppe (FR); Stéphane Bouvier, Sassenage (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/562,551

(22) Filed: May 2, 2000

(30) Foreign Application Priority Data

May 3, 1999 (EP) ........................................... 99410061

(51) Int. Cl.[7] ................................................ G06F 9/00

(52) U.S. Cl. ....................................... 712/233; 712/237

(58) Field of Search ................................ 712/233, 234, 712/235, 236, 237, 238, 220, 225, 227, 229

(56) References Cited

U.S. PATENT DOCUMENTS

| | | | | |
|---|---|---|---|---|
| 5,381,532 A | * | 1/1995 | Suzuki | 712/237 |
| 5,740,415 A | * | 4/1998 | Hara | 712/238 |
| 5,748,936 A | * | 5/1998 | Karp et al. | 712/218 |
| 5,799,180 A | | 8/1998 | Shiell et al. | 395/581 |
| 5,933,628 A | * | 8/1999 | Chang | 712/233 |

FOREIGN PATENT DOCUMENTS

| | | |
|---|---|---|
| EP | 0 180 725 | 5/1986 |
| EP | 0 488 819 | 6/1992 |

OTHER PUBLICATIONS

European Search Report from application No. 99410061, filed May 3, 1999.

Adams, R., et al, *A Parallel Pipelined Processor With Conditional Instruction Execution,* Computer Architecture News, vol. 19, No. 1, Mar. 1, 1991 pp. 135–142, XP000201932 ISSN: 0163–5964.

U.S. patent application Ser. No. 09/562,542, Wojcieszak et al., filed May 2, 2000.

U.S. patent application Ser. No. 09/562,717, Wojcieszak et al., filed May 2, 2000.

U.S. patent application Ser. No. 09/562,718, Wojcieszak et al., filed May 2, 2000.

U.S. patent application Ser. No. 09/563,475, Coffler et al., filed May 2, 2000.

U.S. patent application Ser. No. 09/562,715, Wojcieszak et al., filed May 2, 2000.

U.S. patent application Ser. No. 09/563,610, Wojcieszak et al., filed May 2, 2000.

U.S. patent application Ser. No. 09/563,703, Uguen et al., filed May 2, 2000.

U.S. patent application Ser. No. 09/563,154, Coffler et al., filed May 2, 2000.

U.S. patent application Ser. No. 09/563,704, Coffler et al., filed May 2, 2000.

U.S. patent application Ser. No. 09/563,468, Coffler et al., filed May 2, 2000.

U.S. patent application Ser. No. 09/563,315, Grossier, filed May 2, 2000.

(List continued on next page.)

*Primary Examiner*—Henry W. H. Tsai
(74) *Attorney, Agent, or Firm*—Lisa K. Jorgenson; James H. Morris; Wolf, Greenfield & Sacks, P.C.

(57) ABSTRACT

A computer system for executing instructions predicated on guard indicators included in the instructions. The instructions include normal instructions, which are executed if the guard indicator is true and branch instructions, which are executed if the guard indicator is false. The computer system is operable in a branch shadow mode for comparing the guard indicator of the branch instruction with the guard indicator included in subsequent instructions and for continuing to supply instructions if the guard indicators match and for preventing supply of instructions if the guard indicators do not match. The computer system is also operable to disable the branch shadow mode when the branch instruction has been determined such that the branch is taken or not by resolving the status of the guard indicator.

21 Claims, 2 Drawing Sheets

OTHER PUBLICATIONS

U.S. patent application Ser. No. 09/561,629, Grossier, filed May 2, 2000.

U.S. patent application Ser. No. 09/563,473, Bernard, filed May 2, 2000.

U.S. patent application Ser. No. 09/563,186, Alofs, filed May 2, 2000.

U.S. patent application Ser. No. 09/563,477, Cousin, filed May 2, 2000.

U.S. patent application Ser. No. 09/563,702, Coffler et al., filed May 2, 2000.

U.S. patent application Ser. No. 09/563,634, Coffler et al., filed May 2, 2000.

U.S. patent application Ser. No. 09/563,153, Debbagh et al., filed May 2, 2000.

* cited by examiner

BRANCHING IN A COMPUTER SYSTEM

FIELD OF THE INVENTION

The present invention relates to a method of executing instructions including branch instructions, and to a computer system for such execution.

BACKGROUND TO THE INVENTION

In a superscalar pipelined computer system, the execution of branches can pose a problem. This is particularly the case for predicated branches in a guarded instruction execution system. In a pipelined computer system, branch instructions may be fetched and decoded several machine cycles earlier than the state at which the guard indicator of the branch is resolved (true or false) to determine whether or not the branch is taken. Until the guard indicator of the branch is resolved, the computer system does not know whether the instruction subsequent to the branch instruction which should next be executed is the instruction in the original program sequence which contained the branch instruction, or the instruction at the target address indicated by the branch. In the former case, the branch is not taken and in the latter case the branch is taken. If the branch is taken, it is necessary to start fetching instructions from the target address and to supply these through the pipelined computer system. If the branch is not taken, it is necessary to continue supplying and executing instructions from the original instruction sequence following the branch instruction.

It is desirable to reduce the penalties involved if a branch is not taken by already having available instructions to be executed for that case.

SUMMARY OF THE INVENTION

According to one aspect of the invention there is provided a computer system for executing instructions predicated on guard indicators included in the instructions, the instructions including normal instructions which are executed if the guard indicator is true and branch instructions which are executed if the guard indicator is false, the computer system comprising: instruction supply circuitry; at least one execution unit for receiving instructions from the supply circuitry; branch detection circuitry for detecting a branch instruction, for holding the guard indicator of the branch instruction and for setting a branch shadow mode; means operable in the branch shadow mode for comparing the guard indicator of the branch instruction with the guard indicator included in subsequent instructions and for continuing to supply instructions if the guard indicators match and for preventing supply of instructions if the guard indicators do not match; and means for disabling the branch shadow mode when the branch instruction has been determined such that the branch is taken or not by resolving the status of the guard indicator.

According to another aspect of the invention there is provided a method of executing instructions in a computer system predicated on guard indicators included in the instructions, the instructions including normal instructions which are executed if the guard indicator is true and branch instructions which are executed if the guard indicator is false, the method comprising: supplying instructions to at least one execution unit; detecting a branch instruction and, responsive to such detection, holding the guard indicator of the branch instruction and setting a branch shadow mode; in the branch shadow mode, comparing the guard indicator of the branch instructions with the guard indicator included in subsequent instructions and continuing to supply instructions if the guard indicators match, and preventing the supply of instructions if the guard indicators do not match; and disabling the branch shadow mode when the branch instruction has been determined such that the branch is taken or not by resolving the status of the guard indicator.

The computer system described herein allows instructions to continue to be fetched provided that they are predicated on the same guard indicator as the falsely guarded branch instruction. Therefore, when the guard value for the guard indicator is resolved as false, and the branch is taken, the subsequent instructions are automatically annulled because they are predicated on the guard indicator being true. That is, they would be executed only if the guard indicator is true. Thus no extra action is required in order to avoid these instructions being executed when the branch is taken.

However, if the branch is not taken, the instructions which are predicated on the guard being true will automatically be required next to be executed and will be ready in the pipeline. Therefore there is a significant improvement in latency if the branch is not taken with the system described herein.

The detection of the guard indicator can be carried out in a decoder of the computer system, and therefore the matter can be resolved at an early stage in the pipeline.

For a better understanding of the present invention and to show how the same may be carried into effect, reference will now be made by way of example to the accompanying drawings.

DESCRIPTION OF THE PREFERRED EMBODIMENT

Figure 1:
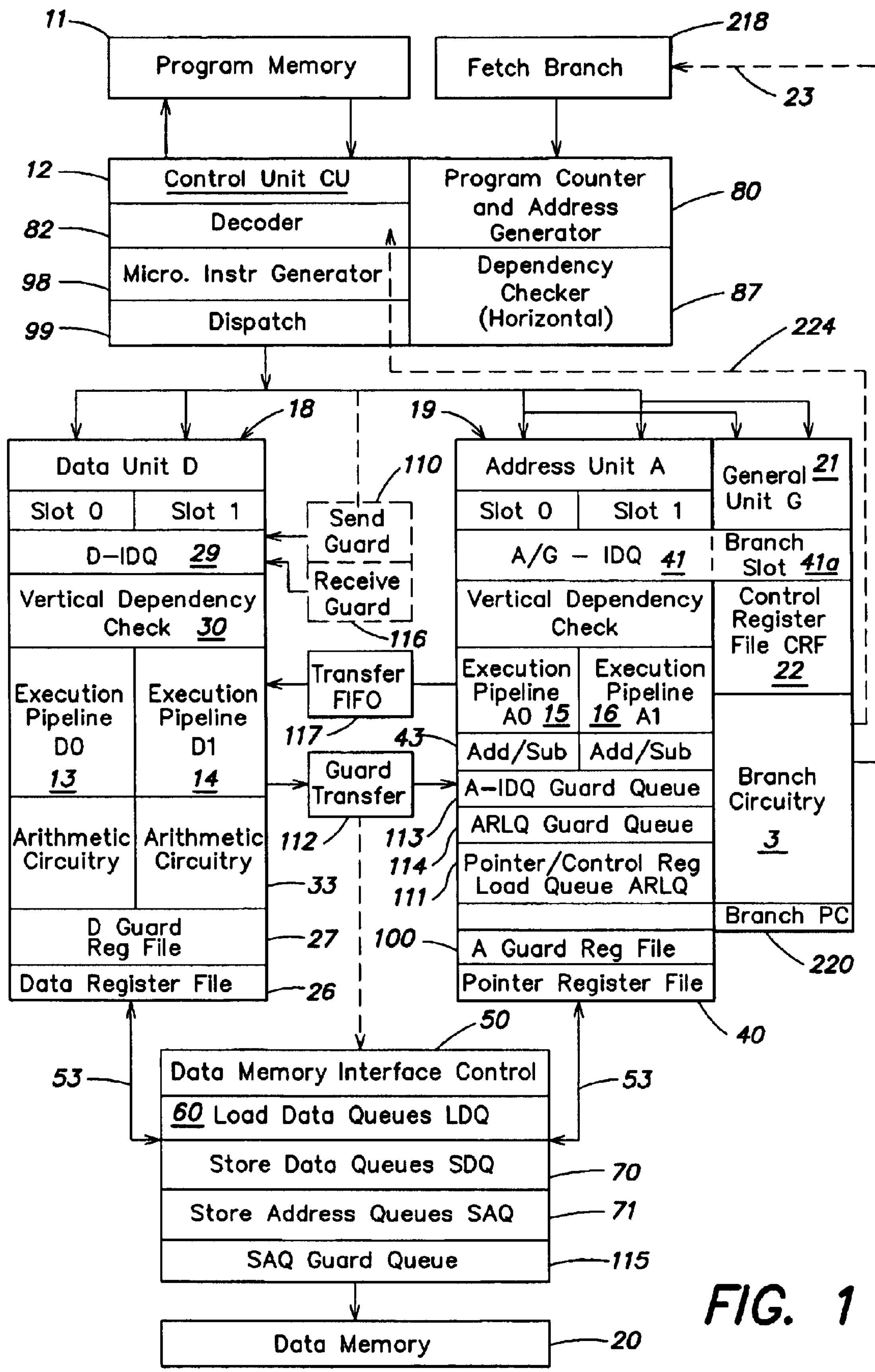
FIG. 1 is a block diagram of a computer system.

Before describing the principles of falsely guarded branch instructions, a computer system using guarded instruction execution will firstly be described by way of background.

The computer system of this example is arranged for the parallel execution of a plurality of instructions and is particularly suited to providing a high digital signal processing (DSP) performance. Instructions are held in a program memory 11 and after passing through a control unit 12 are supplied to four parallel execution pipelines 13,14,15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 19 used to execute instructions for memory accesses to a data memory 20. Slot 1 or Slot 0 of the address unit 19 may also be used to supply instructions to a general unit 21 which shares some resources with the address unit 19. The general unit 21 includes a control register file 22 as well as branch circuitry 3 which is used to provide instruction branch information on line 23 to the control unit 12.

The general unit 21 shares the instruction dispatch queue 41 with the address unit 19. The general unit 21 has a special dedicated slot 41*a* in the A-IDQ 41 where it can put branches while they wait for the guard resolution. When a branch is waiting in this slot, address unit instructions are allowed to bypass the branch and be executed by the address unit (i.e. out-of-order with respect to the branch). This works because of the implementation of branch execution discussed later.

The two pipelines 13 and 14 in the data unit 18 share a common data register file 26 and a common guard register file 27 holding the master guard values which may be associated with the instructions. The two pipelines also derive instructions from a common instruction dispatch queue (D-IDQ) 29 in the data unit 18 and instructions in the queue 29 are checked for data dependency by common vertical dependency check circuitry 30 in the data unit 18. The sequence of operations in each of the pipeline stages in the data unit 18 include an operand fetch usually accessing one of the register files 26 or 27 followed by two execution stages which use arithmetic circuitry 33 followed by a data write stage at which the result of an arithmetic operation is returned to the register file 26 and 27. A similar pipeline exists for both pipelines 13 and 14 on the data unit 18.

Similarly for the address unit 19, both pipelines 15 and 16 access a common register file 40 holding pointer values for use in load or store operations in the data memory 20. The two pipelines each take their instructions from a common instruction dispatch queue (A-IDQ) 41 and a similar vertical dependency check is provided in common for both pipelines 15 and 16 in the address unit 19. The vertical dependency check is similar to that already referred to in the data unit 18. In executing instructions through the two pipelines 15 and 16, accesses will be made to the register file 40. Add and subtract units 43 may be used in execution of the instructions. Each of the pipelines 15 and 16 in the address unit 19 includes an operand fetch followed by an execution stage and an address write back stage.

Both the data unit 18 and the address unit 19 are connected to the data memory 20 through a data memory interface control 50. The control 50 is connected by buses 53 to both the data unit 18 and the address unit 19. The interface control 50 includes a plurality of queues each connected to the buses 53. These queues include load data queues (LDQ) 60 for data awaiting loading into register files of the data unit 18 or address unit 19. The interface control 50 also includes store data queues (SDQ) 70 for data awaiting storage in the memory 20. Store address queues (SAQ) 71 are provided to indicate the locations in the memory 20 at which the data is to be stored.

It will be understood that when instructions are executed to load data from the data memory 20 into the data register files of the data unit 18, the address unit 19 will access the data memory 20 and load the required data into the load data queues 60 prior to completing the update of the data register file 26 by transferring the data from the appropriate queue 60. Similarly when instructions are executed to store data from the data unit 18 into the data memory 20 the appropriate data may be held in the store data queues 70 together with the store addresses in queue 71 prior to completing the store operation in the data memory 20.

By executing the memory addressing instruction in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations the memory latency can be hidden from the executing program.

In the above description, all instructions which are fed through pipelines 13, 14, 15 and 16 are subject to a vertical dependency check and if any data dependency is found which cannot be resolved by a bypass, the execution unit operates to cause a temporary stall in one of the pair of pipelines 13 or 14 or in the pair 15 and 16 so as to cause a temporary delay in one of the pipelines of the pair so as to resolve the data dependency. It will be understood that a check for a data dependency includes any form of data, including data representing guard values.

The control unit 12 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The machine may operate in a selected one of a plurality of instruction modes including superscalar modes of variable instruction bit length or in very long instruction word (VLIW) mode. The control unit 12 may include a process status register to indicate the instruction mode in which the machine is operating.

The control unit 12 includes a prefetch stage which holds instructions which have been fetched from memory ready for supply to the execution units.

In use, a plurality of instructions are obtained from the memory 11 in a single fetch operation during one cycle, brought into the prefetch stage and are subsequently decoded by a decoder 82 in the control unit 12. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 99 through parallel paths 100 to the four parallel execution pipelines 13, 14, 15 and 16 and for the general unit 21. If a horizontal dependency was located, the microinstructions on lines 100 would include an indication to the instruction dispatch queues of the data unit 18 or address unit 19 that some action, such as a pipeline stall, was necessary in the execution pipelines to resolve the horizontal dependency.

In this example, each instruction may be provided with a guard indicator G between G0 and G15. For normal instructions if a guard is true, then the instruction is executed (i.e. updates the architectural state of machine); if a guard is false the architectural state of machine is not changed by instruction execution. Resolution of a guard may be done in different pipeline stages of the machine. As described in the following, a special category of branch instructions is provided which are excepted from this.

The guard for each instruction may be selected between G0 and G15 and in this particular example the guard G15 is always true. The value true or false attributed to guards G0–G14 is however dependent upon the guard values held at any particular time in a guard register file. The master guard register file in this example is guard register file 27 (sometimes referred to herein as the architectural guard register) in the data unit 18.

The guard register file 27 in the data unit 18 maintains the architectural state of the guard values G0 to G14 and the register file is common to both execution pipelines 13 and 14. The operative values of the guards are the same for all execution pipelines.

In this example the master register file for the guard values is held in the data unit 18 as it is the data unit that will most commonly execute instructions likely to change the value of the guards. Greater efficiency of execution cycles is therefore achieved by maintaining the master guard values in the register file which is directly accessed by execution of the instructions in the data unit 18. When instructions are fed through either slot 0 or slot 1 of the data unit 18 the required guard value may be taken directly from the master guard register file 27 in accordance with the guard indicator that accompanied the microinstructions fed into the data unit 18 from the control unit 12.

In the case of instructions to the address unit 19, the guard values required for execution of the instructions in the address unit 19 will need to be obtained from the guard register file 27 in the data unit 18. The microinstructions fed through lines 100 to the execution units will include supplying a "sendguard" (sndg) microinstruction to the data unit 18 at the same time as supplying the appropriate microinstruction to the correct slot of the address unit 19. The "sendguard" microinstruction will be initially slotted into the instruction dispatch queue 29 of the data unit 18 in the same cycle of operations as the microinstruction required for the address unit 19 is slotted into the instruction dispatch queue 41 for the address unit. All micro-instructions in a given execution unit are always executed in order and all guard manipulations and transfers are maintained in order with respect to these micro-instructions. This guarantees the synchronicity of guard transfers (i.e. for every guard emission from a given execution unit there is an opposite guard reception in another execution unit and all these are done in order. The control unit has responsibility to generate the correct micro-instructions for guard transfers; the sending or receiving execution unit only sees the send or receive (respectively) micro-instruction i.e. the action that it must do). In this way the correct sequencing occurs with the correct guard value being obtained from the guard register file 27 corresponding to the instruction being executed in the address unit 19. The supply of the "sendguard" microinstruction in such a situation is illustrated at 110 in the drawing.

The address unit 19 and general unit 21 share a queue of instructions 41 awaiting dispatch to the execution units. There is also a queue 111 (ARLQ) of items awaiting loading into the pointer or control registers 40 or 22. There is also the queue 71 in the memory interface control 50 of store addresses queues awaiting a memory access as a result of partial execution of a store instruction in the address unit 19. When the address unit 19 or general unit 21 awaits a guard transfer from the data unit 18, the instruction is stalled in the A-IDQ 41 or in the ARLQ 111 or in the store address queue 71 until the requested guard value is transmitted from the data unit 18 through guard transfer circuitry 112 to the required destination. The transfer of the correct guard value will occur when the data unit 18 executes in its pipeline operation the "sendguard" microinstruction and the guard value which is transferred to either the address unit 19 or the data memory interface control 50 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111 then the transferred guard value will be held in an ARLQ guard queue 114. In the case of a store instruction where the store address had been added to the SAQ 71 in the interface control 50, the guard value will be transferred from circuitry 112 to an SAQ guard queue 115 in the data memory interface control 50 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 50 prior to checking whether or not the guard value of the store instruction is true or false. The store operation will be held in the queue 71 until the guard value is checked and will only proceed to completion if the guard value is true. In each case where the guard value is transferred to the address unit 19 from the data unit 18, the stalled instruction for the address unit or general unit 21 will be resumed or rendered inoperative depending on the guard value transferred from the data unit file 27.

The use of the guard queues 113, 114 and 115 allow resynchronisation of the guard values with the microinstruction that caused the request "sendguard" 110 to be sent to the data unit 18. The above description for operation of a guarded store instruction indicated how the effective store address could be put on the queue 71 prior to resolving the guard value. The address unit 19 may be operated with an earlier stall in the execution of a store instruction so that the effective address is not calculated and fed to the interface control 50 until after the guard value has been transferred and resolved. Similarly a guarded load instruction may be executed by the address unit 19 to access the memory and obtain the required data for addition to the load data queue 60 prior to resolving the guard value. Alternatively the address unit may cause an earlier stall awaiting resolution of the guard value transferred from the data unit prior to obtaining the data from the memory and putting it into the queue 60. In the case where the data is obtained from the memory and put onto the load data queue 60 prior to resolution of the guard value, the appropriate register file 26, 40 or 22 is updated by a load operation from the load data queue 60 only if the guard value is found to be true. In the case of a false guard value, the register files are not updated and the appropriate execution unit effects a read of the load data queue 60 to remove the unwanted data from the queue without updating any destination register file.

As indicated above, the guard values to be assigned to the guard indicators G0–G14 can be modified by executing a guard modifier instruction. These can be executed by either the data unit 18 or the address unit 19. In the case of a guard modifier instruction executed by the data unit 18, the new guard value is calculated in the execution pipeline of the appropriate slot 0 or slot 1 of the data unit 18 and, whichever of these pipelines has been used, it will cause a new value of the guard to be written into the guard register file 27 at the end of the execution pipeline in order to update the register file 27. The guard modifier instructions may themselves be guarded.

In the case of the guard modifier instruction which is supplied to the address unit 19, the new value will be calculated on execution of the instruction in either slot 0 or slot 1 pipeline of the address unit 19 and the new value can be written into an address guard register file 100 of the address unit 19 at the end of the execution pipeline. However it is necessary for the new guard value to be transferred to the master guard register file 27 of the data unit 18 in order to update that master file at the correct cycle of operation. To achieve this, the control unit 12 arranges to supply a "receive guard" microinstruction to the data unit 18 simultaneously with the supply of any microinstruction to the address unit 19 which will cause a new guard value to be calculated by the address unit 19. This "receive guard" microinstruction is illustrated at 116 in the drawing and is added to the instruction dispatch queue 29 of the data unit 18 in the same cycle as the microinstruction generating a new guard value is supplied to the address unit 19. As soon as the execution pipeline in the address unit 19 has calculated the new guard value it is supplied to a transfer FIFO 117 to enable supply of the new guard value to the data unit 18. The "receive guard" microinstruction supplied to the data unit 18 is treated by the data unit 18 in the same way as a guard modifier instruction except that it does not need to calculate the new guard value but merely obtains it from the FIFO 117.

The microinstruction generating the guard value is supplied to the IDQ 41 of the address unit 19 in the same cycle as the "receive guard" microinstruction is fed to the IDQ 29 of the data unit 18. As explained above, synchronisation is achieved between the two units so that the new guard value transferred through the FIFO 117 updates the master register file 27 at the correct point in the sequence of the instruction execution.

It is possible to execute a load guard register instruction in order to load from memory 20 into the guard register files 27 and 100 of the data unit 18 in the address unit 19. This instruction is treated as a load data register and a load pointer register instruction and the correct value is obtained from memory and put into the load data queues 60. The transfer from the load data queues 60 to the address unit 19 and data unit 18 occurs independently and the data is maintained in the load data queue 60 until both units have read the appropriate data. The microinstructions in the instruction dispatch queues 29 and 41 necessary to load the guard registers 27 and 100 are stalled until the execution units of both the data unit 18 and the address unit 19 is empty of any guard modifier instructions. At that time the load guard register instructions can proceed to transfer the required value from the load data queue 60 into the guard register file without conflict with any other guard modifier instructions.

Having now described the basic guard mechanism, branching will now be described. The control unit is responsible for all the control activity for the computer system. In particular it updates the program counter and address generator 80 according to the current instruction and/or internal and external events. In particular the control unit performs program address generation and instruction fetch and dispatch. The program counter 80 controls the addresses from which instructions are fetched from the program memory. In order to allow branches to be performed, it includes the fetch branch address unit 218 which holds a target address for branching. The target address is the address of the first instruction in the sequence of instructions to which a branch is to be made. The branch location address is the address in the currently executed instruction sequence where a branch instruction is located.

The general unit 21 performs all program branch address calculations and transfers the calculated target addresses to the fetch branch address unit 218 of the control unit on bus 23. For this purpose the general unit 21 includes a branch program counter 220. In normal operation, if a branch instruction is located in the instruction sequence which is currently being executed, it will be supplied to the decoder as described earlier for ordinary instructions and will generate suitable microinstructions, including a branch microinstruction which is supplied to the general unit 21. If the branch instruction is guarded on a guard indicator other than G15, it may be some machine cycles later before the branch is resolved, i.e. before it is determined whether or not the branch is to be taken depending on the guard value. While the branch instruction is being passed through the pipelined stages of the control unit 12, and then into the general unit 21 which is itself pipelined, it would be useful to continue to be able to fetch and decode subsequent instructions to avoid "wasting" machine cycles. However once a branch instruction has been supplied to the decoder the computer system does not know at that point whether the subsequent instructions to be executed are those commencing at the target address for the branch or those in the original instruction sequence immediately following the branch location address. This depends on how the branch is resolved, that is whether it is to be taken or not taken. In the computer system described herein it is noted that if an instruction is acknowledged by the decoder, it will be supplied into the pipelined execution units. That is, the decoder is the "point of no return" for instructions. The computer system according to the presently described embodiment represents a significant improvement in the case that the branch is not taken, that is that the computer system should continue to execute the instructions of the original instruction sequence after the branch location address. If the branch is taken, the prefetch stage in the control unit 12 is flushed of all the speculatively fetched instructions in the normal sequence behind the branch location.

The mechanism for achieving this improvement in the described embodiment relies on the use of guarded instruction execution. For normal instructions, as described above, it would normally be the case that the instruction is executed if the specified guard was true, otherwise the instruction is nopified or annulled (has no effect on the architectural state of the machine). However, the computer system described herein allows for branches to be guarded on a false guard, that is for the branch to be taken if the specified guard is false. These are annotated brf to indicate falsely guarded branches. For all other instructions, the instruction is executed if the specified guard indicator is true, otherwise the instruction is "nopified". The nopification of an instruction effectively means that the instruction has no effect on the architectural state of the machine. This is implemented in a number of different ways depending on the nature of the instruction. Not all branch instruction need to be falsely guarded in the present computer system—the system allows for execution of normally guarded branch instructions but these are not discussed further herein.

In an instruction sequence, a branch shadow can be created by locating instructions following a falsely guarded branch instruction brf by normal instructions guarded on the same guard indicator as the guard indicator for the branch. Any number of such instructions can be located in the branch shadow. It will be appreciated that the branch shadow constitutes what is normally considered to be a delay slot in branching terminology. However, the size of the delay slot or branch shadow is not predetermined—as many instructions as the programmer wishes to include may be included provided only that they are guarded on the same guard indicator as the falsely guarded branch.

An exemplary instruction sequence is given below:

| | | |
|---|---|---|
| | Gy? instr 1 | : execute instr 1 if Gy is true |
| | Gx? brf (address) | : branch to address if Gx is false |
| branch ( | Gx? instr 2 | : execute instr 2 if Gx is true |
| shadow ( | Gx? instr 3 | : execute instr 3 if Gx is true |

The decoder 82 contains circuitry for determining whether or not an instruction follows the rules attributed to a branch shadow by detecting the guard indicator for the falsely guarded branch and comparing that with the guard indicator for each subsequent instruction. When the decoder detects a falsely guarded branch, it enters a "branch shadow" mode. In this mode, the decoder acknowledges only instructions guarded on the same guard indicator as the falsely guarded branch, and any nops. Nops are "no operation" instructions which, although unconditional, may pass in the branch shadow because they have no effect on the architectural state of the machine. It stops issuing acknowledgements as soon as an instruction breaks the rules of the branch shadow, that is if another branch instruction occurs, an instruction not guarded on the guard indicator of the falsely guarded branch, unconditional instructions etc. It exits the branch shadow mode as soon as the general unit 21 has resolved the branch as to be taken or not taken. Thus, a falsely guarded branch is detected at the decoder itself to set the branch shadow mode, and the branch shadow mode is unset by a signal on line 224 from the general unit 21 to the decoder 82 indicating that the branch has been resolved.

Figure 2:
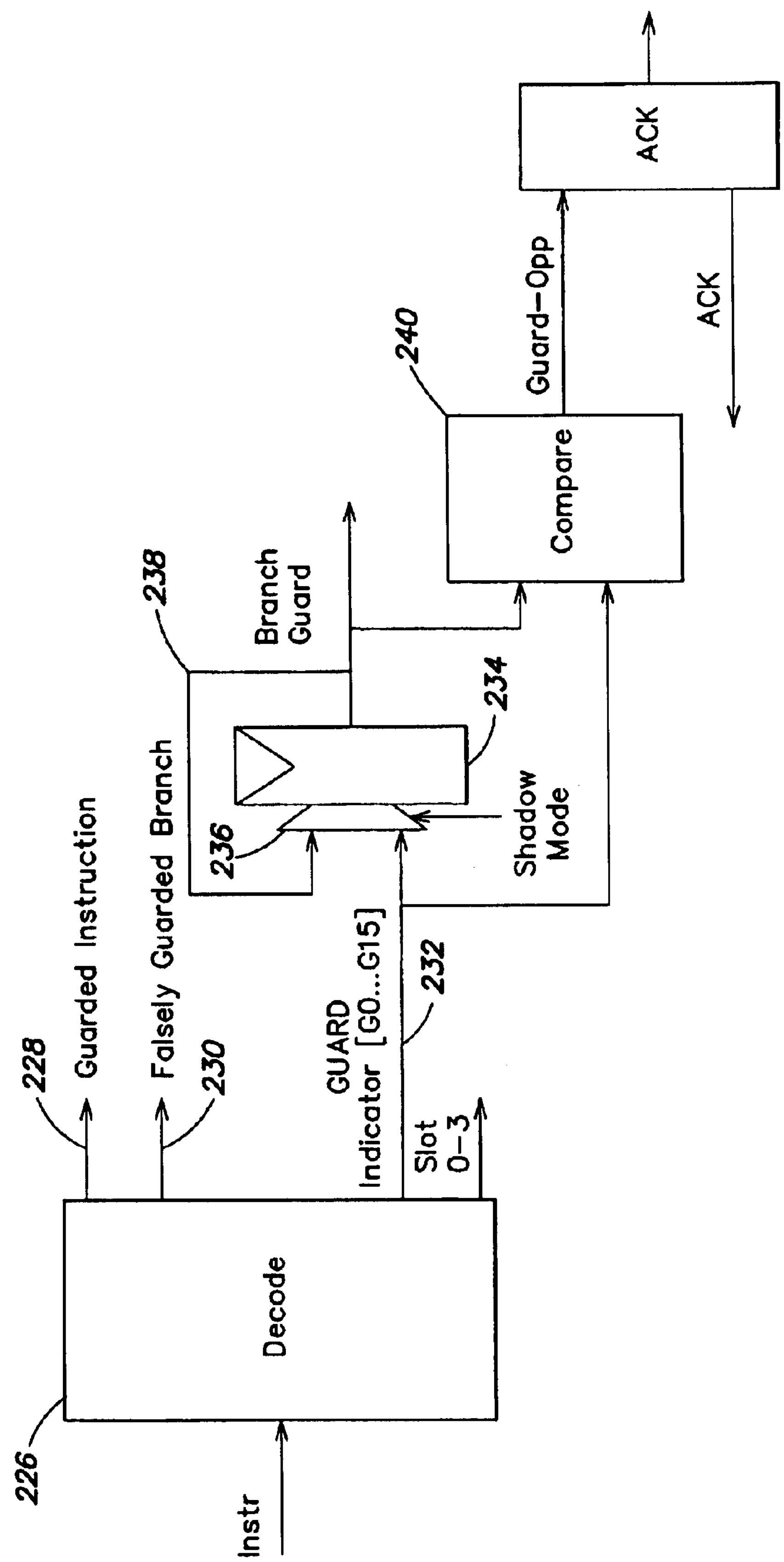
FIG. 2 is a block diagram of guard indicator detection circuitry for branching.

The branch shadow mode circuitry in the decoder 82 is illustrated in FIG. 2. Instructions are supplied to a decode block 226 from the program memory 11 along the line marked INSTR. The decode block 226 produces decoded instructions on slots 0 to 3 as outputs to the microinstruction generator 98. In addition, the decode block 226 produces three guard related outputs. The first guard related output 228 indicates normally guarded instructions. The second output 230 indicates guarded branches guarded on a false guard. The third output 232 is the guard indicator for the incoming instruction. When a falsely guarded branch 230 is indicated, the guard indicator on line 232 is held in flip-flop 234. The flip-flop 234 has a multiplexor 236 on its input to allow the branch guard indicator to be circulated by feedback path 238 when in branch shadow mode, or the guard indicator for the incoming instruction to be held when not in branch shadow mode. When in branch shadow mode, the guard indicator on the incoming instructions is supplied to a comparator 240 which receives the recirculated branch guard indicator for comparison purposes. The output signal of comparator guard_opp is set when the current instruction is guarded on the same guard as the guard indicator for the falsely guarded branch which has been circulated in the flip-flop 234. If the guard-opp signal is set, the instruction is acknowledged (ack) and further instructions continue to be supplied to the decoder. If the guard-opp signal is not set, the instruction is not acknowledged and the control unit takes appropriate action to prevent further instructions from being supplied. When the decoder is not in branch shadow mode, the guard indicator 232 is merely supplied directly via the flip-flop 234 to the comparator, where it is effectively compared with itself to ensure that guard_opp remains set.

The branch detection circuitry in the decoder has the effect of only permitting instructions after a falsely guarded branch instruction to carry on being supplied through the computer system if they are guarded on the same guard indicator as a falsely guarded branch. Therefore, if the branch is not taken, that is the guard is not false, it means that the guard is true which necessarily means that all of the following instructions which have been allowed through should carry on to be executed. This thus significantly reduces the penalty in the situation that the branch is not taken. Of course, if a branch is taken, that is, the guard value is false, then the following instructions will automatically be nopified or annulled because their guard indicators will be resolved as false. Therefore the computer system does not have to take any additional action not to execute these instructions. Of course, there is a time penalty incurred here, but this is only when the branch is taken. When the branch is not taken, the described system significantly reduces the time penalty involved.

Referring back to the dedicated branch slot 41*a* for branch instructions in the A-IDQ 41, it is now clear why the resulting out-of-order execution has no effect. The decoder blocks all instructions after the branch instruction other than those following the rules of the branch shadow. So, if the branch is not taken, they are executed normally behind the not taken branch (i.e. the fact that they were executed out-of-order with respect to the branch has no effect). If the branch is taken then these instructions will be nopified so again the fact that they were executed out-of-order with respect to the branch has no effect.

It will be appreciated that a programmer can maximise the improvement by locating as many instructions as possible in the dynamic branch shadow following the branch instruction. The programmer (or software toolchain, compiler etc) can put from zero up to N instructions in the branch shadow; the hardware then dynamically takes the instructions that meet the shadow rules as defined earlier. Each instruction that is put into the branch shadow will help to reduce the penalty when the branch is not taken up to a maximum useful number depending on the number of cycles the machine takes to resolve the branch.

Note also that since the data unit 18 is separate from the address unit 19, data unit instructions can go into the branch shadow without restriction.

What is claimed is:

1. A computer system for executing instructions predicated on guard indicators included in the instructions, the instructions including normal instructions which are executed if the guard indicator is true and branch instructions which are executed if the guard indicator is false, the computer system comprising:

instruction supply circuitry;

at least one execution unit for receiving instructions from the supply circuitry;

branch detection circuitry for detecting a branch instruction, for holding the guard indicator of the branch instruction and for setting a branch shadow mode;

means operable in the branch shadow mode for comparing the guard indicator of the branch instruction with the guard indicator included in subsequent instructions and for continuing to supply instructions if the guard indicators match and for preventing supply of instructions if the guard indicators do not match; and means for disabling the branch shadow mode when the branch instruction has been determined such that the branch is taken or not by resolving the status of the guard indicator.

2. A computer system according to claim 1, which comprises a decoder for decoding the instructions and wherein the branch detection circuitry is located in the decoder.

3. A computer system according to claim 1, which comprises a plurality of parallel execution units for receiving respective said instructions from the instruction supply circuitry, wherein each instruction has a respective guard indicator selected from a set of guard indicators.

4. A computer system according two claim 3, wherein one of said execution units includes a master guard value store containing a master representation of current values for the guard indicators in said set of guard indicators, and another one of said execution units is responsible for executing branch instructions, said other execution unit being operable to request and receive from said master store a guard value for resolving a branch instruction.

5. A computer system according to claim 1, wherein the instruction supply circuitry comprises a control unit which includes a fetch branch address unit for holding a branch target address.

6. A computer system according to claim 1, in which each execution unit comprises a plurality of pipelined stages, with synchronized pipeline cycles for each of the execution units when a plurality of execution units are present.

7. A computer system according to claim 1, which comprises a plurality of pipelined stages for supplying, decoding and executing instructions.

8. A computer system according to claim 3, wherein the execution units include execution pipelines providing access to a data memory, said pipelines including a first set of pipelines for use in executed instructions need for memory access operations, a second set of pipelines arranged to carry out arithmetic operations, thereby providing decoupling of memory access operations from arithmetic operations, and a third pipeline for executing branch instructions.

9. A computer system according to claim 8, wherein the second set of pipelines and the third pipeline share an instruction queue holding instructions awaiting access to the pipelines, the third pipeline having a dedicated slot for holding branch instructions awaiting resolution while instructions from the instruction queue continue to be supplied to the pipelines.

10. A method of executing instructions in a computer system predicated on guard indicators included in the instructions, the instructions including normal instructions which are executed the guard indicator is true and branch instructions which are executed if the guard indicator is false, the method comprising:

supplying instructions to at least one execution unit;

detecting a branch instruction and, responsive to such detection, holding the guard indicator of the branch instruction and setting a branch shadow mode;

in the branch shadow mode, comparing the guard indicator of the branch instructions with the guard indicator included in subsequent instructions and continuing to supply instructions if the guard indicators match, and preventing the supply of instructions if the guard indicators do not match; and disabling the branch shadow mode when the branch instruction has been determined such that the branch is taken or not by resolving the status of the guard indicator.

11. A method according to claim 10, in which there is more than one execution unit and wherein normal instructions are supplied to a first execution unit, and branch instructions are supplied to a second execution unit.

12. A method according to claim 11, wherein the first set of execution units hold a master guard value store containing a master representation of current values for the guard indicators, the method comprising transferring the value of a guard indicator to the second set of execution units in order to resolve the branch.

13. A computer system for executing instructions predicated on guard indicators included in the instructions, the instructions including normal instructions which are executed if the guard indicator is true and branch instructions which are executed if the guard indicator is false, the computer system comprising:

instruction supply circuitry;

at least one execution unit for receiving instructions from the supply circuitry:

branch detection circuitry for detecting a branch instruction, for holding the guard indicator of the branch instruction and for setting a branch shadow mode;

a comparer operable in the branch shadow mode for comparing the guard indicator of the branch instruction with the guard indicator included in subsequent instructions and for continuing to supply instructions if the guard indicators match and for preventing supply of instructions if the guard indicators do not match; and a disabler for disabling the branch shadow mode when the branch instruction has been determined such that the branch is taken or not by resolving the status of the guard indicator.

14. A computer system according to claim 13, which comprises a decoder for decoding the instructions and wherein the branch detection circuitry is located in the decoder.

15. A computer system according to claim 13, which comprises a plurality of parallel execution units for receiving respective said instructions from the instruction supply circuitry, wherein each instruction has a respective guard indicator selected from a set of guard indicators.

16. A computer system according two claim 15, wherein one of said execution units includes a master guard value store containing a master representation of current values for the guard indicators in said set of guard indicators, and another one of said execution units is responsible for executing branch instructions, said other execution unit being operable to request and receive from said master store a guard value for resolving a branch instruction.

17. A computer system according to claim 13, wherein the execution units include execution pipelines providing access to a data memory, said pipelines including a first set of pipelines for use in executed instructions need for memory access operations, a second set of pipelines arranged to carry out arithmetic operations, thereby providing decoupling of memory access operations from arithmetic operations, and a third pipeline for executing branch instructions.

18. A computer system according to claim 17, wherein the second set of pipelines and the third pipeline share an instruction queue holding instructions awaiting access to the pipelines, the third pipeline having a dedicated slot for holding branch instructions awaiting resolution while instructions from the instruction queue continue to be supplied to the pipelines.

19. A computer system according to claim 13, wherein the instruction supply circuitry comprises a control unit which includes a fetch branch address unit for holding a branch target address.

20. A computer system according to claim 13, in which the or each execution unit comprises a plurality of pipelined stages, with synchronized pipeline cycles for each of the execution units when a plurality of execution units are present.

21. A computer system according to claim 1, which comprises a plurality of pipelined stages for supplying, decoding and executing instructions.

* * * * *